Patented Sept. 7, 1948

2,448,946

UNITED STATES PATENT OFFICE 2,448,946

METHOD FOR INSOLUBILIZING HYDROLYZED ETHYLENE VINYL ESTER POLYMERS

Witty L. Alderson, Jr., Wilmington, Del., assignor to E. I. du Pont de Nemours & Company, Wilmington, Del., a corporation of Delaware No Drawing. Application June 20, 1944, Serial No. 541,269

5 Claims. (Cl. 260—86)

This invention relates to polymeric materials, and more particularly to methods for insolubilizing hydrolyzed ethylene/vinyl ester polymers.

This invention has as an object to provide a practical and simple method for rendering insoluble in organic solvents hydrolyzed ethylene/vinyl ester polymers. Other objects will appear hereinafter.

The above and other objects are accomplished by blending an organic solvent soluble hydrolyzed ethylene/vinyl ester polymer with at least 2% by weight of a compound capable of generating free radicals when heated and then heating the blend until insolubilization occurs.

In accomplishing the above objects the hydrolyzed vinyl ester polymer and free radical generating compound, preferably a diacyl peroxide, is blended by first softening the polymer with a solvent, homogeneously incorporating the peroxide by mechanical working, and then heating the blend thus obtained at a temperature above 100° C. but below the decomposition temperature of the polymer until insolubilization occurs. In a preferred embodiment a hydrolyzed ethylene/vinyl acetate polymer derived from an ethylene/vinyl acetate polymer having a mole ratio of ethylene to vinyl acetate of about 3:1 is immersed in a latent solvent such as a 1:1 benzene/ethanol or a 1:1 trichloroethylene/butanol mixture at room temperature until it is thoroughly softened. The colloided polymer is then compounded with from 5–10% of benzoyl peroxide, by weight, on a rubber mill at 30–40° C. The homogenized mixture is then heated in a press for 5 minutes at 130° C.

The following example is further illustrative of the practice of the invention. Unless otherwise specified the parts are by weight.

One hundred parts of a substantially completely hydrolyzed ethylene/vinyl acetate polymer derived from an ethylene/vinyl acetate polymer having an ethylene/vinyl acetate mol ratio of 3:1 is allowed to stand for 4 hours at room temperature in a mixture of 200 parts of benzene and 200 parts of ethanol. The swollen product thus obtained is transferred to a rubber mill heated at 30° to 40° C. and thoroughly blended with 10 parts of benzoyl peroxide dissolved in 100 parts of benzene. The mixture is worked on the mill until it is substantially free of solvent. It is then stripped from the rolls in the form of a thin sheet, which is then heated in a press for 15 mins. at 130° C. The cured product obtained in this fashion is less soluble and less thermoplastic than the untreated polymer, as is shown by the data in the table below.

| Polymer | Solubility in Boiling Trichloroethylene/Butanol 1:1 Mixture | Zero Strength Temp., °C. | Plastic Flow [1] at 120° C., (per cent) |
|---|---|---|---|
| Untreated polymer | Soluble | 120 | 100 |
| Cured polymer | Insoluble | 345 | 74 |

[1] Per cent decrease in thickness of 10 mil films subjected to a load of 90 p. s. i. for 2 hours at 120° C.

This invention is generally applicable to any ethylene/vinyl ester polymer which has been hydrolyzed to any extent and in which the vinyl ester is that of an aliphatic monocarboxylic acid. Best results are obtained with polymers derived from ethylene/vinyl esters having an ethylene/vinyl ester ratio greater than about 2.5 and which have been hydrolyzed to at least 25%. Specific examples are the products obtained by hydrolyzing the polymers, obtained by polymerizing ethylene with vinyl chloroacetate, vinyl propionate, vinyl laurate, vinyl stearate and the like.

Although the examples have illustrated the use of benzoyl peroxide, the process is operable with any compound which is capable of generating free radicals when heated. The choice of a particular curing agent depends somewhat on the ethylene/vinyl acetate mol ratio of the polymer. Thus, for hydrolyzed ethylene/vinyl acetate polymers derived from polymers having an ethylene/vinyl acetate mol ratio of about 3:1, best results are obtained with diacyl peroxides, e. g., benzoyl peroxide, lauroyl peroxide, acetyl benzoyl peroxide, propionyl peroxide, and the like. On the other hand, hydrolyzed ethylene/vinyl acetate polymers derived from polymers containing an ethylene/vinyl acetate mol ratio greater than 10:1 are effectively insolubilized with such free radical generating compounds as the lead alkyls and their salts (lead diethyl dibromide), N-chloro derivatives of organic amides, such as, for example, Chloramine T, as well as N-chloroderivatives of amines and hydantoins ("Dactin"); amine oxides, such as trimethylamine oxide; inorganic peroxides such as hydrogen peroxide, barium peroxide and the like, as well as with acyl peroxides such as benzoyl peroxide. In general, best results are obtained with benzoyl peroxide and generally speaking the diacyl peroxides constitute the preferred class of agents for use in the practice of this invention. The amounts of peroxide or other free radical producing agents used is generally in the range of 5–10% on the weight of the polymer.

Larger amounts, for example up to 25% can, however, be used since the upper limit is not particularly important except from the standpoint of its presence as a foreign material in the finished product.

As a rule the process is operated at temperatures in excess of 100° C. but best results are obtained by heating at temperatures in the range of 120° to 200° C., the lower temperatures requiring longer periods of heating. In general, a temperature of 140° C. requires a heating time of about 1 min. whereas a temperature of 110° C. requires about 15 min. to achieve the same results.

Best results are obtained when the uncured compositions described above are heated to the desired temperature as rapidly as possible. For this reason, in actual operation the process of this invention is carried out in a preheated press or mold under superatmospheric pressures.

When peroxides such as benzoyl peroxide are used as crosslinking agents, compounding is best carried out as described in the example because hydrolyzed ethylene/vinyl acetate polymers are not soluble in their known solvents below the decomposition temperatures of the peroxides. However, if a more stable free radical generator such as Chloramine T or lead diethyl dibromide is used it can be blended with the polymer in a mutual solvent.

To the compositions of this invention there may be added reinforcing agents, fillers, dyes, and the like.

The products of this invention are useful as thermosetting adhesives, molded articles, in the casting of films and fibers, in the coating of fabrics, as safety glass interlayers, as impregnants for paper, cloth and other bibulous materials, tubes and the like, liners for food containers and bottle caps, etc.

The process of this invention provides a simple and practical method for insolubilizing polymers from hydrolyzed ethylene/vinyl acetate polymers, and for the production of shaped and molded articles from these polymers.

As many apparently widely different embodiments of this invention may be made without departing from the spirit and scope thereof, it is to be understood that I do not limit myself to the specific embodiments thereof except as defined in the appended claims.

I claim:

1. A process which comprises blending an organic solvent soluble completely hydrolyzed ethylene-vinyl ester polymer, in which the ratio of ethylene/vinyl organic ester is greater than 2.5:1, with from 2% to 25% by weight of said polymer of a compound selected from the group consisting of acyl peroxides and inorganic peroxides, and then heating the blend at a temperature of from 100° C. to 200° C. until said polymer becomes insoluble in organic solvent in which it was initially soluble, said polymer being that obtained by hydrolyzing the copolymerization product of ethylene and a vinyl alcohol ester of a saturated aliphatic monocarboxylic acid.

2. The process set forth in claim 1 in which said polymer is hydrolyzed ethylene-vinyl acetate.

3. The process set forth in claim 1 in which said compound is an acyl peroxide.

4. A process which comprises blending an organic solvent soluble completely hydrolyzed ethylene-vinyl acetate polymer, in which the ratio of ethylene/vinyl acetate is greater than 2.5:1, with from 5% to 10% by weight of an acyl peroxide, and then heating the blend at a temperature below 200° C. until said polymer becomes insoluble in organic solvent.

5. The process set forth in claim 4 in which said acyl peroxide is benzoyl peroxide.

WITTY L. ALDERSON, Jr.

REFERENCES CITED

The following references are of record in the file of this patent:

UNITED STATES PATENTS

| Number | Name | Date |
| --- | --- | --- |
| 2,200,429 | Perrin et al. | May 14, 1940 |
| 2,322,756 | Wallder | June 23, 1943 |

OTHER REFERENCES

Biggs et al., article in Chem. Eng. News, June 25, 1943, pages 962–3.

Gilman, "Organic Chemistry," pages 626–7, pub. by Wiley, 1943, 2nd ed.